(12) United States Patent
Koganezawa et al.

(10) Patent No.: US 9,670,847 B2
(45) Date of Patent: Jun. 6, 2017

(54) TWO-SHAFT GAS TURBINE

(71) Applicant: Mitsubishi Hitachi Power Systems, Ltd., Yokohama, Kanagawa (JP)

(72) Inventors: Tomomi Koganezawa, Yokohama (JP); Yasuo Takahashi, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 312 days.

(21) Appl. No.: 14/457,679

(22) Filed: Aug. 12, 2014

(65) Prior Publication Data

US 2015/0068215 A1 Mar. 12, 2015

(30) Foreign Application Priority Data

Sep. 6, 2013 (JP) ................................. 2013-184596

(51) Int. Cl.
*F02C 9/16* (2006.01)
*F02C 9/28* (2006.01)
*F02C 3/10* (2006.01)

(52) U.S. Cl.
CPC ............... *F02C 9/16* (2013.01); *F02C 3/10* (2013.01); *F02C 9/28* (2013.01); *F05D 2270/20* (2013.01); *F05D 2270/304* (2013.01)

(58) Field of Classification Search
CPC ...... F02C 9/16; F02C 9/20; F02C 9/28; F02C 9/54; F02C 3/10; F05D 2270/3015; F05D 2270/303; F05D 2270/304; F05D 2270/20
See application file for complete search history.

(56) References Cited

U.S. PATENT DOCUMENTS

| | | | |
|---|---|---|---|
| 4,341,071 A | 7/1982 | Abo et al. | |
| 5,622,045 A * | 4/1997 | Weimer | F02C 9/16 60/204 |
| 2004/0112037 A1* | 6/2004 | Yagi | F01D 15/10 60/39.3 |

FOREIGN PATENT DOCUMENTS

| | | |
|---|---|---|
| EP | 1 548 236 A2 | 6/2005 |
| EP | 1 712 761 A2 | 10/2006 |
| JP | 2011-38531 A | 2/2011 |
| JP | 2011-102548 A | 5/2011 |

OTHER PUBLICATIONS

European Search Report dated Feb. 5, 2015 (Five (5) pages).

* cited by examiner

*Primary Examiner* — Andrew Nguyen
(74) *Attorney, Agent, or Firm* — Crowell & Moring LLP (57) ABSTRACT

A 2-shaft gas turbine can suppress an increase in NOx emission from a combustor even when degradation of compressor efficiency occurs due to a decrease in performance with long-term use. The 2-shaft gas turbine has a gas generator and a power turbine, and includes a controller configured to set, in accordance with a degree of degradation of compressor efficiency computed from measured control parameters, a target speed of the gas generator at a level lower than a target speed in a state where degradation of the compressor efficiency has not occurred. The controller is configured to control the rotating speed of the gas generator on the basis of a difference between the target speed thus set and an actual rotating speed.

6 Claims, 6 Drawing Sheets

TWO-SHAFT GAS TURBINE

BACKGROUND OF THE INVENTION

1. Field of the Invention

The present invention relates to a 2-shaft gas turbine including a gas generator and a power turbine.

2. Description of the Related Art

A 2-shaft gas turbine mainly includes a gas generator and a power turbine (a low-pressure turbine) connected to a load, the gas generator employing a compressor, at least one combustor, and a high-pressure turbine. The gas generator and the power turbine each have a rotating shaft and both rotating shafts are not connected to each other. In addition, rotating speeds of the gas generator and the power turbine are controlled independently of each other.

JP-2011-38531-A describes a technology relating to a method for controlling the rotating speed of a rotating shaft on the side of a gas generator. Specifically, JP-2011-38531-A discloses the control method having two control modes in order to solve a sympathetic vibration problem caused by an alteration in rotating speed attributable to a variation in ambient air temperature. In the first control mode, an angle of an inlet guide vane (IGV) of a compressor is adjusted on the basis of the corrected rotating speed of a gas generator shaft which is used when the gas generator rotates at a low speed in accordance with ambient air temperature. In the second control mode, the angle of the inlet guide vane (IGV) of the compressor is adjusted so as to keep constant the actual rotating speed of the gas generator shaft which is used when the gas generator rotates at a high speed.

JP-2011-102548-A describes a technology relating to output control for controlling the output of a gas turbine. Specifically, JP-2011-102548-A discloses a control method in which a target speed is corrected in the following steps. The power output of a low-pressure turbine is first obtained by subtracting a load of a high-pressure turbine from the total output of a turbine. A rotating speed correction value is then computed from the power output thus obtained and an output upper limit value which is set separately. The target speed is lastly corrected on the basis of the rotating speed correction value thus computed.

SUMMARY OF THE INVENTION

When the 2-shaft gas turbine has been used for a significant period of time, airborne dust will be attached to compressor blades, leading to decrease in compressor efficiency. This will result in power for the rotation of the compressor to be larger. If the control is exercised to keep the corrected rotating speed or actual rotating speed of the gas generator constant as in JP-A-2011-38531, it is necessary to reduce the angle of the inlet guide vane (IGV) of the compressor to lower the air volume of the compressor. This control cancels out the decrease in compressing power due to the reduced air volume with the increase in the compressing power due to the degradation of the compressor efficiency. The rotating speed can be kept constant accordingly.

At this time, however, the combustor for the gas generator has its fuel concentration rise because of the lowered air flow rate, making the combustion temperature higher as a consequence. The control above thus has a disadvantage that NOx emission from the combustor increases. In particular, when the output of the power turbine is controlled to be constant as in JP-A-2011-102548, a fuel flow rate increases to compensate for the power decreased according to the reduced air volume. And the NOx emission will further be greater. Additionally, since the performance of the compressor generally tends to be degraded as the angle of the IGV becomes smaller, the control for keeping the rotating speed of the gas generator constant makes the angle of the IGV further smaller, which leads to even larger volume of the NOx emission.

It is, accordingly, an object of the present invention to provide a 2-shaft gas turbine that can suppress an increase in the NOx emission from a combustor even when compressor efficiency is decreased due to a drop in performance with long-term use.

To solve the above problems, the present invention comprises: means for measuring control parameters of the compressor; and a controller configured to set, in accordance with a degree of degradation of the compressor efficiency computed from the measured control parameters, a target speed of the gas generator at a level lower than a target speed in a state where degradation of the compressor efficiency has not occurred, and to control the rotating speed of the gas generator on the basis of a difference between the target speed thus set and an actual rotating speed.

The present invention can provide a 2-shaft gas turbine that can suppress an increase in the NOx emission from a combustor even when compressor efficiency is decreased due to a drop in performance with long-term use.

DESCRIPTION OF THE PREFERRED EMBODIMENTS (1) First Embodiment

Preferred embodiments of the present invention will hereinafter be described with reference to the drawings.

Figure 1:
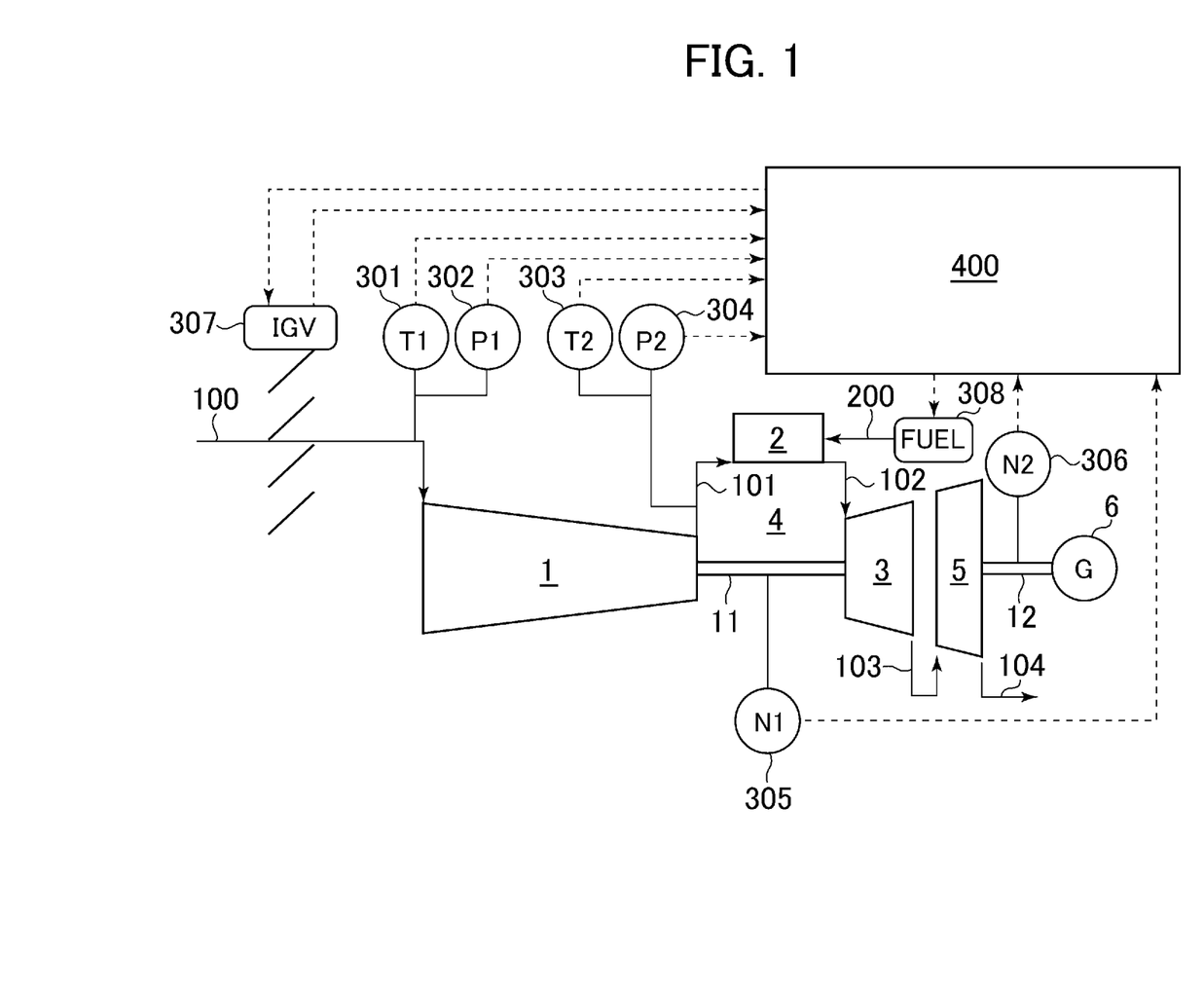
FIG. 1 is a flow diagram illustrating the structure of a 2-shaft gas turbine according to a first embodiment of the present invention.

FIG. 1 is a flow diagram illustrating an overall structure of a 2-shaft gas turbine according to a first embodiment of the present invention. As illustrated in FIG. 1, the 2-shaft gas turbine is mainly constituted of a gas generator 4 and a power turbine 5.

The gas generator 4 mainly includes a compressor 1, at least one combustor 2 and a high-pressure turbine 3. The compressor 1 compresses air 100 to generate high-pressure air 101 for combustion. The combustor 2 burns the compressed air 101 introduced from the compressor 1 and fuel 200 to generate combustion gas 102. The high-pressure turbine 3 is driven by the combustion gas 102 generated by the combustor 2. The compressor 1 and the high-pressure turbine 3 are connected to each other through a rotating shaft 11 of the gas generator. The compressor 1 is driven by the high-pressure turbine 3.

On the other hand, the power turbine (the low-pressure turbine) 5 is driven by the combustion gas 103 from the gas generator. A generator 6 as a load is coupled to the power turbine 5 through a rotating shaft 12 and is driven by the power turbine 5. The rotating speeds of the gas generator 4 and the power turbine 5 are controlled independently of each other by a controller 400.

A temperature detector 301 which detects inlet temperature T1 and a pressure detector 302 which detects inlet pressure P1 are installed at the inlet of the compressor 1. A temperate detector 303 which detects outlet temperature T2 and a pressure detector 304 which detects outlet pressure P2 are installed at the outlet of the compressor 1. In addition, a rotation speed indicator 305 which detects a rotating speed N1 of the gas generator 4 is attached to the rotating shaft 11. A rotation speed indicator 306 which detects a rotating speed N2 of the power turbine 5 is secured to the rotating shaft 12.

A description is next given regarding the control on the rotating speed of the 2-shaft gas turbine according to the present embodiment.

The rotating speed of the power turbine 5 is controlled by adjusting a fuel feed system 308 to increase or decrease the flow rate of the fuel 200. If the generator 6 is independent of other generators, the rotating speed of the generator 6 and the power turbine 5 lowers when electric power consumption rises. Therefore, the flow rate of the fuel 200 is raised on the basis of a difference between a target speed and an actual rotating speed N2, which is the measurement result of the rotating speed indicator 306. The rotating speed N2 is controlled so as to be kept at the target speed. In contrast, if the electric power consumption decreases, the rotating speed of the generator 6 and the power turbine 5 increases. Therefore, the flow rate of the fuel 200 is reduced on the basis of the difference between the target speed and the actual rotating speed N2. The rotating speed N2 is controlled so as to be kept at the target speed.

On the other hand, if the generator interconnects with a power grid along with other generators, the rotating speed N2 of the generator 6 and the power turbine 5 corresponds to the frequency of the power grid. Instead of the direct control of the rotating speed N2, the power turbine 5 is controlled by increasing or decreasing the flow rate of the fuel 200 in proportion to the increase or decrease in power that the generator 6 is commanded to output.

A description will now be given regarding the control on the rotating speed N1 on the side of the gas generator 4. As described above, the fuel flow rate is determined by controlling the rotating speed on the power turbine side. However, the output of the high-pressure turbine 3 is also increased or decreased by increasing or decreasing the fuel flow rate. On the contrary, the gas generator 4 side is controlled, for example, by varying the angle of an inlet guide vane 307 so as to achieve a balance between the output of the high-pressure turbine 3 and the power of the compressor 1.

Figure 2:
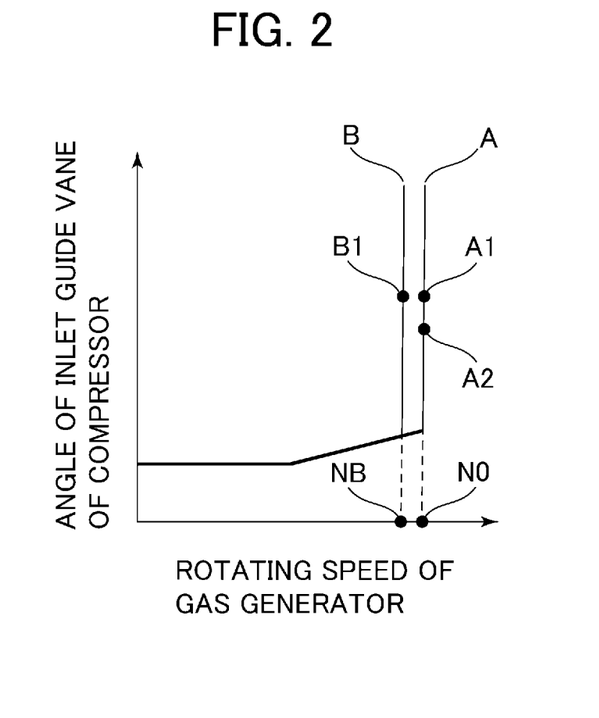
FIG. 2 shows a relation between a rotating speed of a gas generator and an angle of an inlet guide vane of a compressor.

More specifically, if the output of the high-pressure turbine 3 is increased along with the growth in fuel flow rate to enhance the rotating speed (the horizontal axis in FIG. 2) as shown in FIG. 2, control is exercised to extend the angle of the inlet guide vane on a vertical axis to increase a compressor suction air volume. Increasing the compressor suction air volume makes the power of the compressor larger, thereby achieving a balance between the output of the high-pressure turbine 3 and the power of the compressor 1.

On the contrary, if the output of the high-pressure turbine 3 is decreased along with the decline in fuel flow rate to lower the rotating speed on the horizontal axis in FIG. 2, control is exercised to narrow the angle of the inlet guide vane on the vertical axis to decrease the suction air volume of the compressor. Decreasing the suction air volume of the compressor makes the power of the compressor smaller, whereby a balance can be achieved between the output of the high-pressure turbine 3 and the power of the compressor 1 again.

In the high speed range, the angle of the compressor inlet guide vane 307 is largely varied with respect to the rotating speed 305 of the gas generator, for example, as indicated by a solid line "A" in FIG. 2. In this way, the rotating speed can be controlled so as to be substantially constantly kept at the target speed.

In FIG. 2, the solid line "A" represents an operation line of a case of not applying the correction of the rotating speed taking into account efficiency degradation due to a decrease in performance with long-term use (the case including one where a decrease in performance with long-term use has not occurred). A solid line "B" represents an operation line of a case of applying the correction of rotating speed taking into account efficiency degradation due to a decrease in performance with long-term use. Symbol "A1" represents a state where the efficiency of the compressor 1 has not decreased. Symbols "A2" and "B1" represent a state where the efficiency of the compressor 1 has decreased.

In the case "A2", the correction of rotating speed taking into account efficiency degradation due to a decrease in performance with long-term use is not applied. Control is exercised so that the rotating speed N1 of the gas generator 4 may be equal to that of the case A1 by reducing the angle of the compressor inlet guide vane 307 along with the enhanced power of the compressor due to efficiency degradation. Consequently, the flow rate of combustion air flowing into the combustor is made smaller for a higher fuel concentration. Thus, NOx emission tends to increase due to the rise in flame temperature. On the other hand, in the case "B1", the rotating speed of the gas generator is made slower by way of the after-mentioned control to correct the rotating speed taking into account the efficiency degradation due to a decrease in performance with long-term use. Therefore, the angle of the inlet guide vane 307 can be maintained equally to that of the case "A1". In this way, a reduction of combustion air flowing into the combustor can be suppressed to make it possible to restrain an increase in NOx emission.

Figure 3:
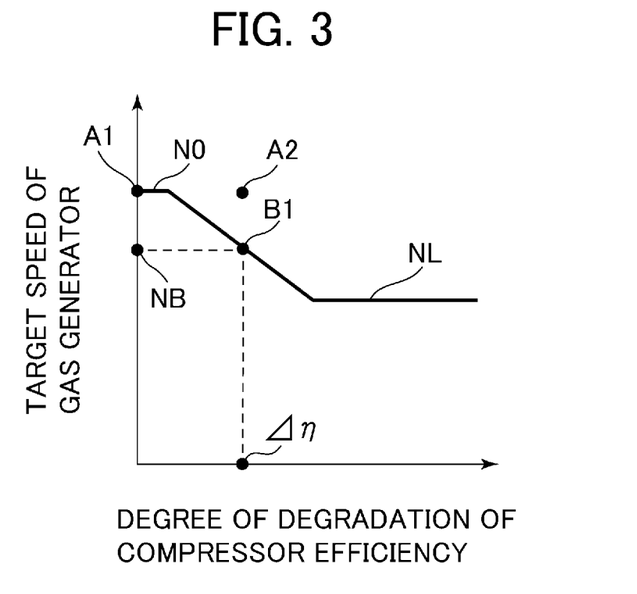
FIG. 3 shows the relation between a degree of degradation of the compressor efficiency and a target speed of a gas generator.
Figure 4:
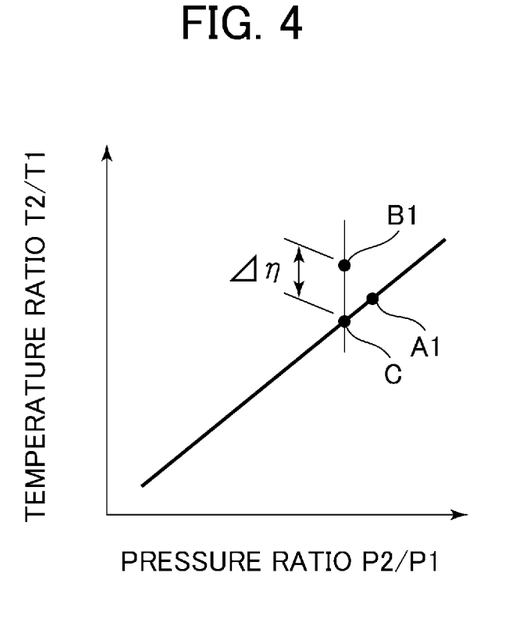
FIG. 4 is a relation diagram which concurrently shows, as an example of means for detecting the degradation of the compressor efficiency, one example of a computing unit 403 which obtains from a pressure ratio a temperature ratio in a state where the compressor is not subjected to degradation in efficiency, and one example of a computing unit 404 which obtains an efficiency degradation degree ($\Delta\eta$) from a difference from the detected temperature ratio.
Figure 5:
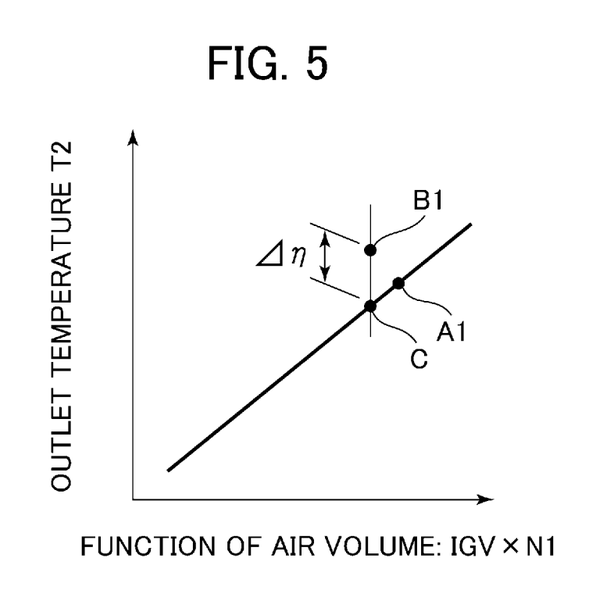
FIG. 5 is a relation diagram which concurrently shows, as another example of means for detecting the degradation of the compressor efficiency, one example of the computing unit 403 which obtains from the angle of an IGV and a rotating speed the outlet temperature of the compressor in the state where the compressor is not subjected to the efficiency degradation, and one example of the computing unit 404 which obtains an efficiency degradation degree ($\Delta\eta$) from a difference from the detected outlet temperature.
Figure 6:
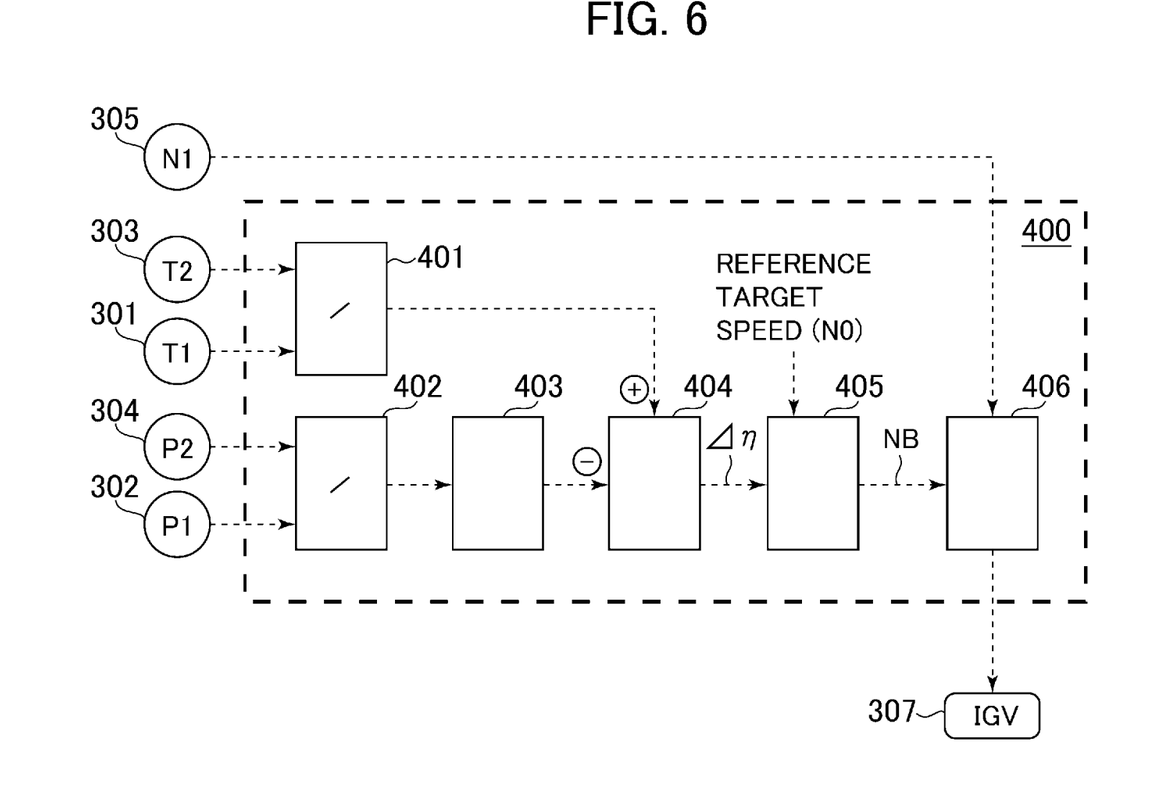
FIG. 6 is a block diagram illustrating the details of a controller according to a first embodiment of the present invention.

The controller 400 included in the 2-shaft gas turbine of the present embodiment will here be detailed with reference to FIGS. 3 to 6. FIG. 6 is a block diagram illustrating the constitution of the controller. FIGS. 3 to 5 are graphs each schematically showing the relation between the input and output of a computing unit in the controller.

The inlet temperature T1 and outlet temperature T2 of the compressor 1 are measured respectively with the temperature detectors 301 and 303, such as thermo couples, and are input to the controller 400. The computing unit 401 outputs e.g. a temperature ratio T2/T1. Similarly, the inlet pressure P1 and outlet pressure P2 of the compressor 1 are measured respectively with pressure detectors 302 and 304, such as pressure transmitters, and are input to the controller 400. The computing unit 402 outputs e.g. a pressure ratio P2/P1. This pressure ratio P2/P1 is input to the computing unit 403.

The computing unit 403 outputs a temperature ratio "C" in the state where the efficiency of the compressor 1 has not been decreased with reference to the value of the pressure ratio P2/P1, for example, as indicated by a solid line in FIG. 4. Then, a computing unit 404 computes an efficiency degradation degree $\Delta\eta$ of the compressor 1 on the basis of a difference between the actual temperature ratio T2/T1 "B1" and the temperature ratio "C" as the output of the computing unit 403 (a value in the state where the efficiency of the compressor 1 has not decreased). The efficiency degradation degree $\Delta\eta$ of the compressor 1 is the output of the computing unit 404.

As shown in FIG. 4 for example, a computing unit 405 outputs a target speed of the gas generator on the basis of the efficiency degradation degree $\Delta\eta$. Specifically, symbol "N0" in FIG. 3 represents a target speed (a rated rotating speed) in a state where the efficiency of the compressor 1 has not decreased. The computing unit 405 sets a target speed "NB" smaller than the target speed "N0" in accordance with the efficiency degradation degree $\Delta\eta$. Incidentally, if the efficiency degradation degree $\Delta\eta$ is extremely large, the target speed excessively lowers, reducing the surge margin of the compressor 1. In the present embodiment, therefore, the target speed has a lower limit NL set thereto so that a sufficient margin may be kept to ensure reliability even if the efficiency degradation degree $\Delta\eta$ is extremely large.

According to the relation shown in FIG. 2, a computing unit 406 controls the angle of the inlet guide vane (IGV) on the basis of the difference between the target speed and the actual rotating speed N1. In this way, a balance is achieved between the power of the compressor 1 and the output of the high-pressure turbine 3, thereby exercising control so that the rotating speed N1 of the gas generator may be on the solid line of symbol "B" in FIG. 2. The computing unit 406 has the target speed NB input therein. As shown in FIG. 2, the target speed in the high speed range has changed from the N0 state to the NB state due to the degradation of the compressor efficiency.

In the above description, the temperature T1 and pressure P1 at the inlet of the compressor 1 and the temperature T2 and pressure P2 at the outlet thereof are used as control parameters of the compressor 1 as shown in FIG. 4. However, as shown in FIG. 5 for example, an air flow rate parameter corresponding to the pressure ratio P2/P1 may be obtained from information on the angle of the inlet guide vane (IGV) and the rotating speed (N1) instead of measuring the pressure ratio P2/P1. A command value of the angle of the inlet guide vane (IGV) from the controller 400 can be used in place of the measured value of the angle of the inlet guide vane (IGV) as well. This control is performed on the basis of the rotating speed (N1) as described above. Therefore, it is not necessary to provide the pressure detectors 302 and 304 in order to measure respectively the inlet pressure P1 and the outlet pressure P2 of the compressor. The control can be exercised easily accordingly. Furthermore, the inlet temperature T1 of the compressor can usually be estimated to some extent from a season or time. The efficiency degradation degree $\Delta\eta$ can easily be estimated only by measuring the outlet temperature T2 of the compressor as shown in FIG. 5.

As described above, the 2-shaft gas turbine of the present embodiment includes: means for measuring the control parameters of the compressor; and the control unit 400 which sets, in accordance with the efficiency degradation degree $\Delta\eta$ of the compressor 1 computed from the control parameters thus measured, the target speed of the gas generator 4 at a level lower than the target speed N0 in a state where the degradation of the compressor 1 efficiency has not occurred, the control unit further controlling the rotating speed N1 of the gas generator 4 on the basis of the difference between the target speed NB thus set and the actual rotating speed N1. According to the 2-shaft gas turbine of the present embodiment having the structure described above, even if the efficiency decreases because airborne dust is attached to compressor blades, the angle of the inlet guide vane (IGV) will not excessively be reduced. Therefore, a ratio between the fuel 200 and the fuel air 101 in the combustor 2 can be kept appropriately and an increase in NOx emission can be suppressed.

The means for measuring the control parameters include the means 303 for detecting the air temperature T2 at the compressor outlet, and additionally include any or all of the means 301 for detecting the air temperature T1 at the compressor inlet, the means 302 for detecting the pressure P1 at the compressor inlet, and the means 304 for detecting the air pressure P2 at the compressor outlet. The outlet air temperature T2 and air volume of the compressor 1 can thereby be figured out. The efficiency degradation degree $\Delta\eta$ of the compressor 1 constituting part of the 2-shaft gas turbine can be figured out more accurately, which makes it possible to exercise control with a high degree of reliability. An increase in NOx emission can be suppressed effectively as a result.

The means for measuring the control parameters may include the means 303 for detecting the air temperature T2 at the compressor outlet, and additionally include any or all of the means for detecting the angle of the inlet guide vane 307 of the compressor, the means 305 for detecting the rotating speed N1 of the gas generator 4, and the means 304 for detecting the air pressure P2 at the compressor outlet. Also in such a case, the outlet air temperature T2 and air volume of the compressor can be figured out. The efficiency degradation degree $\Delta\eta$ of the compressor 1 constituting part of the 2-shaft gas turbine can be figured out more accurately, which makes it possible to exercise control with a high degree of reliability. Thus, an increase in NOx emission can be suppressed effectively.

The target speed taking into account the efficiency degradation degree $\Delta\eta$ has the lower limit NL set thereto. Therefore, the 2-shaft gas turbine of the present embodiment can keep a sufficient surge margin even if the efficiency degradation degree $\Delta\eta$ is extremely large. The reliability of the control can accordingly be ensured.

(2) Second Embodiment

A second embodiment of the present invention will next be described with reference to FIGS. 7 and 8.

Figure 7:
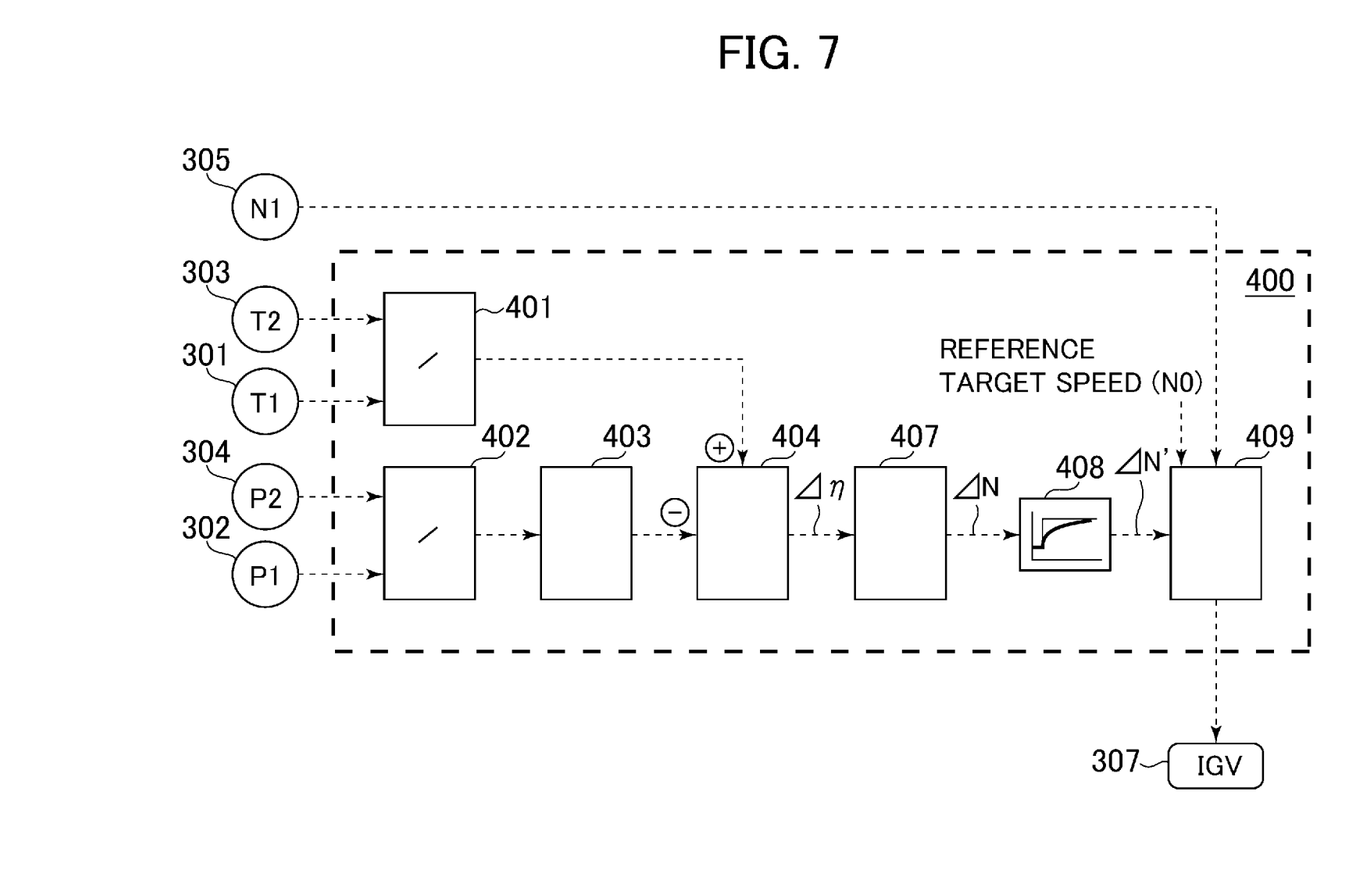
FIG. 7 is a block diagram illustrating the details of a controller according to a second embodiment of the present invention.
Figure 8:
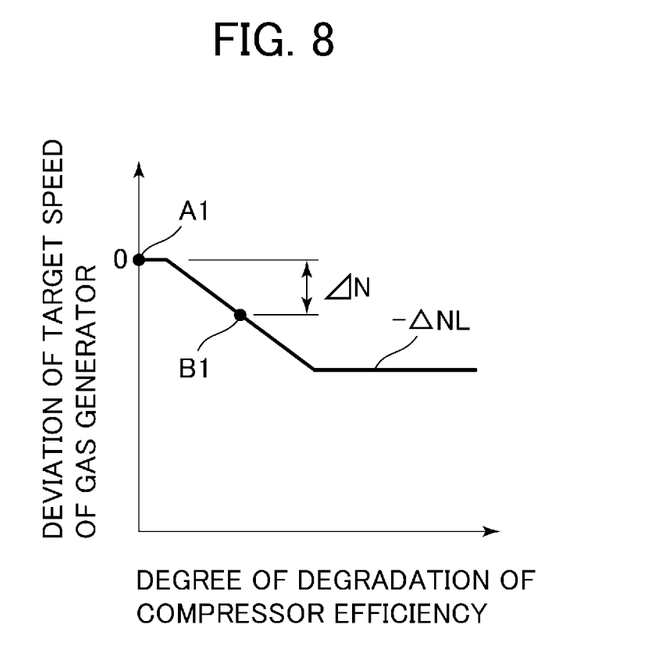
FIG. 8 shows a relation between a degree of the degradation of a compressor efficiency and a target speed deviation of a gas generator according to the second embodiment of the present invention.

The second embodiment is different from the first one illustrated in FIGS. 6 and 3 corresponding to FIGS. 7 and 8, respectively, in that a first-order lag element 408 is inserted to reduce the temporal variation rate of a target speed through control taking into account the efficiency degradation degree.

A computing unit 407 in FIG. 7 receives, as an input, an efficiency degradation degree $\Delta\eta$ which is the output of the computing unit 404. After computing a deviation of the target speed of the gas generator, the unit outputs the deviation. A specific example is described with reference to FIG. 8.

If compressor efficiency has not decreased (A1), the deviation is computed as 0 as in FIG. 8 so as to make the target speed of the gas generator equal to the target speed "N0" in FIG. 3. The more airborne dust is attached to compressor blades, the larger the value of the efficiency degradation degree $\Delta\eta$ will be. The absolute value of a target speed deviation $\Delta N$ increases accordingly. In the case where the efficiency degradation degree $\Delta\eta$ is extremely large, the surge margin of the compressor 1 will be small if the target speed is lowered more than that. The target speed deviation thus has a lower limit $-\Delta NL$ set thereto. The target speed is set so as not to be below the lower limit NL even when the efficiency degradation degree $\Delta\eta$ is extremely large.

The first-order lag element 408 adds a first-order lag to a variation of the target speed deviation $\Delta N$ to make a target speed deviation $\Delta N'$ and inputs it to a computing unit 409. The computing unit 409 obtains an actual target speed from the sum of the target speed deviation $\Delta N'$, which is the output of the first-order lag element 408, and the reference rotating speed N0. In this way, as shown in FIG. 2, the target speed in the high speed range varies from the reference target speed N0 to a target speed NB taking into account the degradation degree of the compressor efficiency. In other words, the operation line varies from the solid line A to the solid line B.

In accordance with the relation shown in FIG. 2, the computing unit 409 controls the angle of the inlet guide vane (IGV) 307 on the basis of the difference between the rotating speed N1 (305) and target speed NB of the gas generator. In this instance, a balance between the power of the compressor 1 and the output of the high-pressure turbine 3 is achieved, thereby controlling the rotating speed N1 so as to be on the line B in FIG. 2. The lag element is not added to this control, and because of that, a time constant of control for the target speed is set so as to be larger.

An advantage resulting from the larger time constant of the control for the target speed is as below.

The computing unit 406 in the first embodiment controls the angle of the inlet guide vane (IGV) on the basis of the rotating speed N1 of the gas generator. The time constant for this control, dependent on velocity for detecting the rotating speed and velocity for driving the inlet guide vane, is on the order of several seconds. If the angle of the IGV changes due to this control, values such as temperatures, pressures, rotating speed, and the angle of the IGV to be measured by the control parameter measuring means are also varied. Meanwhile, the decrease in performance with long-term use of the compressor appears on the order of from several weeks to several months. A variation in state quantity not attributable to the decrease in performance with long-time use may affect the target speed control, making the control unstable (e.g. causing hunting). To prevent such unstable control, it is necessary to minutely adjust a control set value.

In contrast to this, the target speed is controlled by adding the first-order lag to the output value of the efficiency degradation degree in the second embodiment. This control can make the time constant for the control for changing the target speed in accordance with the efficiency degradation degree $\Delta\eta$ greater than the time constant for the rotating speed control exercised on the basis of the difference between the actual rotating speed N1 and the target speed NB. Thus, the stability of the rotating speed control for the gas generator 4 can be improved.

The stability of the rotating speed control for the gas generator 4 is improved to thereby stabilize the flow rate of the combustion air 101 flowing into the combustor as well. The ratio between the fuel 200 and the consumption air 101 is stably kept within an appropriate range. Thus, an increase in NOx emission can be suppressed more reliably.

As described above, the 2-shaft gas turbine described in each embodiment can suppress an increase in NOx emission from the combustor while maintaining the output of the power turbine even when the efficiency of the compressor is subjected to degradation due to the decrease in performance with long-term use.

What is claimed is:

1. A 2-shaft gas turbine comprising:
a gas generator including a compressor provided with an inlet guide vane at an intake, a combustor for burning air compressed in the compressor and fuel to generate combustion gas, and a high-pressure turbine rotated by the combustion gas from the combustor to drive the compressor;
a power turbine rotated by discharge gas from the high-pressure turbine to drive load equipment; and
a controller configured to control rotating speed of the gas generator on the basis of a difference between a target speed and an actual rotating speed of the gas generator,
wherein control parameters of the compressor include at least an outlet temperature of the compressor,
wherein the 2-shaft gas turbine further comprises a first temperature detector for detecting the outlet temperature, and
wherein the controller is further configured to compute a degree of a compressor efficiency degradation from the control parameters and set, in accordance with the degree of the compressor efficiency degradation, due to a decrease in performance with long-term use, the target speed at a level lower than the target speed in a state where the compressor efficiency degradation has not occurred.

2. The 2-shaft gas turbine according to claim 1,
wherein the control parameters includes an inlet temperature, an inlet pressure and an outlet pressure of the compressor, and
wherein the 2-shaft gas turbine further comprises a second temperature detector for detecting the inlet temperature, a first pressure detector for detecting the inlet pressure, and a second pressure detector for detecting the outlet pressure.

3. The 2-shaft gas turbine according to claim 1,
wherein the control parameters include an angle of the inlet guide vane of the compressor and the actual rotating speed of the gas generator, and
wherein the 2-shaft gas turbine further comprises a rotation speed indicator for detecting the actual rotating speed of the gas generator.

4. The 2-shaft gas turbine according to claim 1,
wherein the target speed taking into account the degree of the compressor efficiency degradation has a lower limit set thereto.

5. The 2-shaft gas turbine according to claim 1,
wherein a time constant of the control for changing the target speed in accordance with the degree of the compressor efficiency degradation is set at a level greater than a time constant of the speed control of the gas generator exercised on the basis of a difference between the actual rotating speed and the target speed.

6. A method for operating a 2-shaft gas turbine comprising:

operating a gas generator including a compressor provided with an inlet guide vane at an intake, a combustor for burning air compressed in the compressor and fuel to generate combustion gas, and a high-pressure turbine rotated by the combustion gas from the combustor to drive the compressor; and a power turbine rotated by discharge gas from the high-pressure turbine to drive load equipment, and controlling rotating speed of the gas generator on the basis of a difference between a target speed and an actual rotating speed, computing a degree of a compressor efficiency degradation from at least an outlet temperature of the compressor, wherein, in accordance with the degree of the compressor efficiency degradation, due to a decrease in performance with long-term use, the target speed of the gas generator is set at a level lower than the target speed in a state where the compressor efficiency degradation has not occurred.

* * * * *